United States Patent [19]
Kark et al.

[11] Patent Number: 6,052,772
[45] Date of Patent: Apr. 18, 2000

[54] MEMORY REQUEST PROTOCOL METHOD

[75] Inventors: Kevin W. Kark; William Wu Shen; George C. Wellwood, all of Poughkeepsie, N.Y.

[73] Assignee: International Business Machines Corporation, Armonk, N.Y.

[21] Appl. No.: 09/059,114

[22] Filed: Apr. 13, 1998

[51] Int. Cl.[7] .................................................. G06F 11/00
[52] U.S. Cl. .............................. 712/38; 712/33; 711/151; 711/158
[58] Field of Search ..................... 395/800.32, 800.38; 712/32, 33, 38; 711/2, 117, 151, 158, 167

[56] References Cited

U.S. PATENT DOCUMENTS

| | | | |
|---|---|---|---|
| 4,385,351 | 5/1983 | Matsuura et al. ....................... | 364/200 |
| 4,837,682 | 6/1989 | Culler ..................................... | 364/200 |
| 4,901,226 | 2/1990 | Barlow .................................... | 364/200 |
| 5,168,570 | 12/1992 | Eckert et al. .......................... | 395/725 |
| 5,564,062 | 10/1996 | Meaney et al. ........................ | 395/732 |
| 5,715,472 | 2/1998 | Meaney et al. ........................ | 395/800 |

*Primary Examiner*—Meng-Ai T. An
*Assistant Examiner*—Dzung Nguyen
*Attorney, Agent, or Firm*—Lynn L. Augspurger

[57] ABSTRACT

A memory request protocol allows a memory request to be withdrawn or "cancelled" without penalty so no memory resource is wasted in doing so during an assigned "cancel window". When the memory card starts to process a command from the memory controller, for a predefined number of cycles a period of time is available where the memory card can't accept another command due to a resource conflict. This provides an opportunity to re-balance requests to the memory controller in this period of time or "cancel window".

4 Claims, 2 Drawing Sheets

MEMORY REQUEST PROTOCOL METHOD

FIELD OF THE INVENTION

This invention is related to computers and computer systems and in particular to a protocol for a command response interface between a memory requestor and memory controller of a computer system that allows the memory controller to tell a memory requestor that the current access request presented to the controller can be withdrawn ("cancelled").

BACKGROUND OF THE INVENTION

In the S/390 G5 storage controller and hierarchical memory subsystem, upto four independent storage banks have been implemented with each having its own dedicated memory controller and each memory controller having its own dedicated group of memory requestors and its own dedicated memory card which permits highly concurrent operation. In this type of system, the memory card was designed to serve as an S/390 main and expanded storage with both levels of memory being located on the same physical unit.

Between the memory requester and the memory controller of the system there exists an asynchronous protocol with regard to making requests to the memory controller which results in access commands being sent to the memory card attached to the memory controller. The memory controller for each storage bank thus provides an asynchronous grant response to its requester when the memory card resources become available to that requestor.

Between the memory controller and the memory card, there exists a well defined protocol logic dictating when the memory controller can send or receive data to and from the memory card. In many machines, like the G5, the memory card is also operating in a multiple memory bank configuration of its own (i.e can process multiple requests concurrently). Some past designs have had a "cancel mechanism" where the memory controller, upon receiving a cancel signal from the memory requestor, tells the memory card that the current request is being cancelled. However, even when DRAM access in the memory card can be suppressed by the early arrival of the cancel request, the memory card has already wasted some cycles of processing in addition to recovery time in order to be able to process the next access request. While this command was cancelled, any other requestor still has to wait until the bus protocol is no longer busy. This impacts memory utilization and throughput. If the late arrival of the cancel request prevented the suppression of the DRAM access, the memory card processing and recovery time is even longer impacting memory utilization and throughput to a greater extent.

In such systems, in order to maximize system throughput, we could have multiple requests into a memory controller one each from different ones of multiple memory requesters while simultaneously the memory requestors are accessing the Remote Cache. Then, there could be a situation where a request to the memory controller is no longer needed because the latest data were found in the Remote Cache or the Remote Cache rejected the request because of a conflict which requires the requestor to be recycled later on. With high cache hit ratios, there could be a significant impact to memory utilization and ultimately to throughput by the memory card processing the unwanted accesses.

SUMMARY OF THE INVENTION

Our invention provides a memory controller and interface logic with a memory requestor in which a memory request can be withdrawn ("cancelled") without penalty and allowing another memory request to be accepted by the memory controller so that it can be processed once the memory card is no longer busy.

Our memory request protocol logic allows a memory request to be withdrawn or "cancelled" without penalty so no memory resource is wasted by providing a "cancel window." When the memory card starts to process a command from the memory controller, there exists a finite number of cycles (the cancel window) where the memory card can't accept another command due to a resource conflict. This provides an opportunity to re-balance requests to the memory controller via the cancel window. These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1:
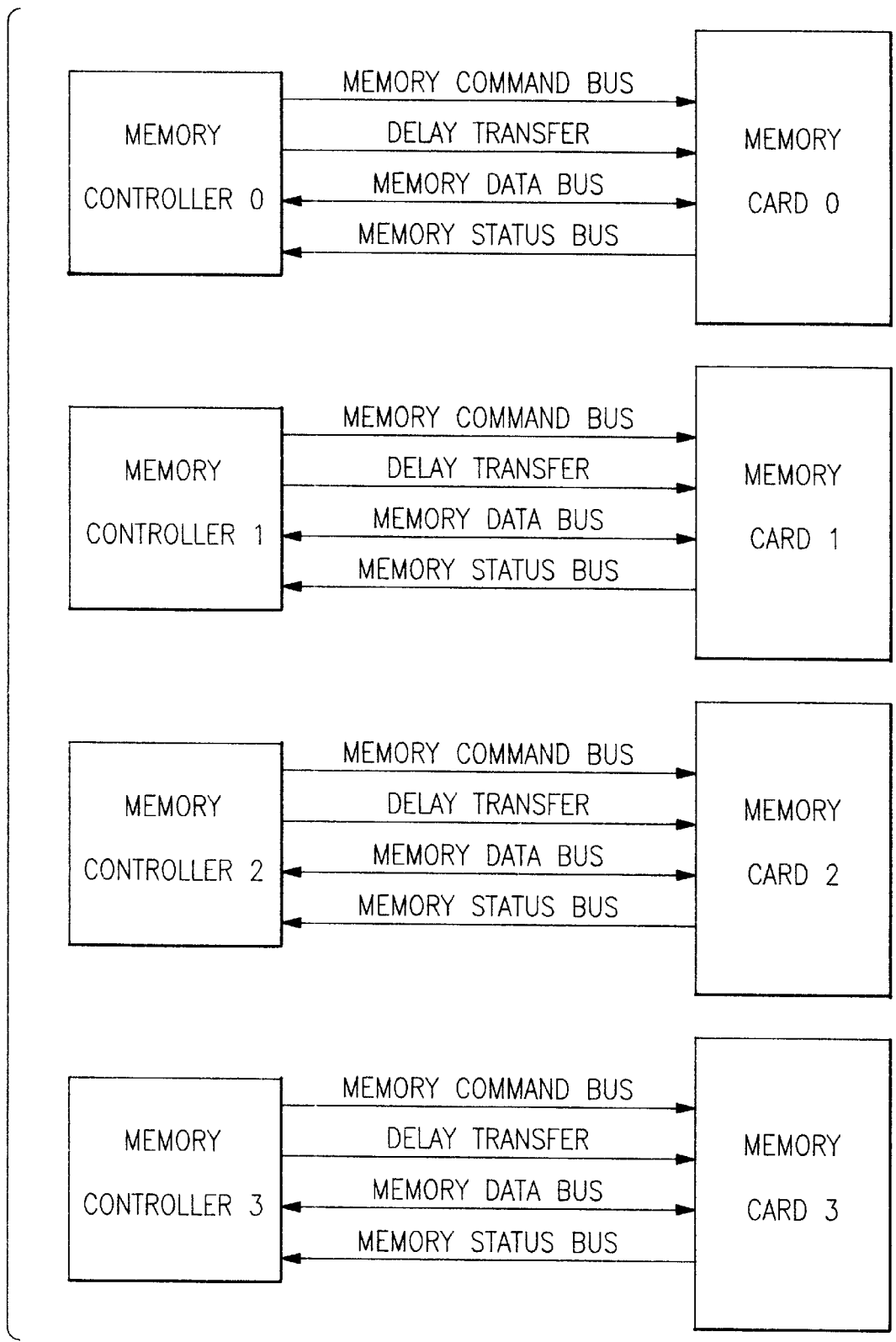
FIGS. 1 and 2 show schematically an overview of the preferred embodiment.

In accordance with our preferred embodiment, we provide for a machine illustrated in FIG. 1 which can send a memory request to the memory card every 8 cycles due to the S/390 key access cycle within the memory card, and has a unique synchronized memory controller that knows exactly when to send a new request or when not to send a request to the memory card, and further has a memory requestor that has been given the priority to send an access request to the memory controller and if subsequently the memory requestor has determined that it wants to "cancel" its request before the memory controller has accepted it for execution, the memory controller has a "memory requester cancel window" where that particular requester can safely withdraw its request such that the memory controller and the memory card will NOT process this request and No memory cycles will be wasted. Thus, memory resources are immediately available for other memory requesters.

Figure 2:
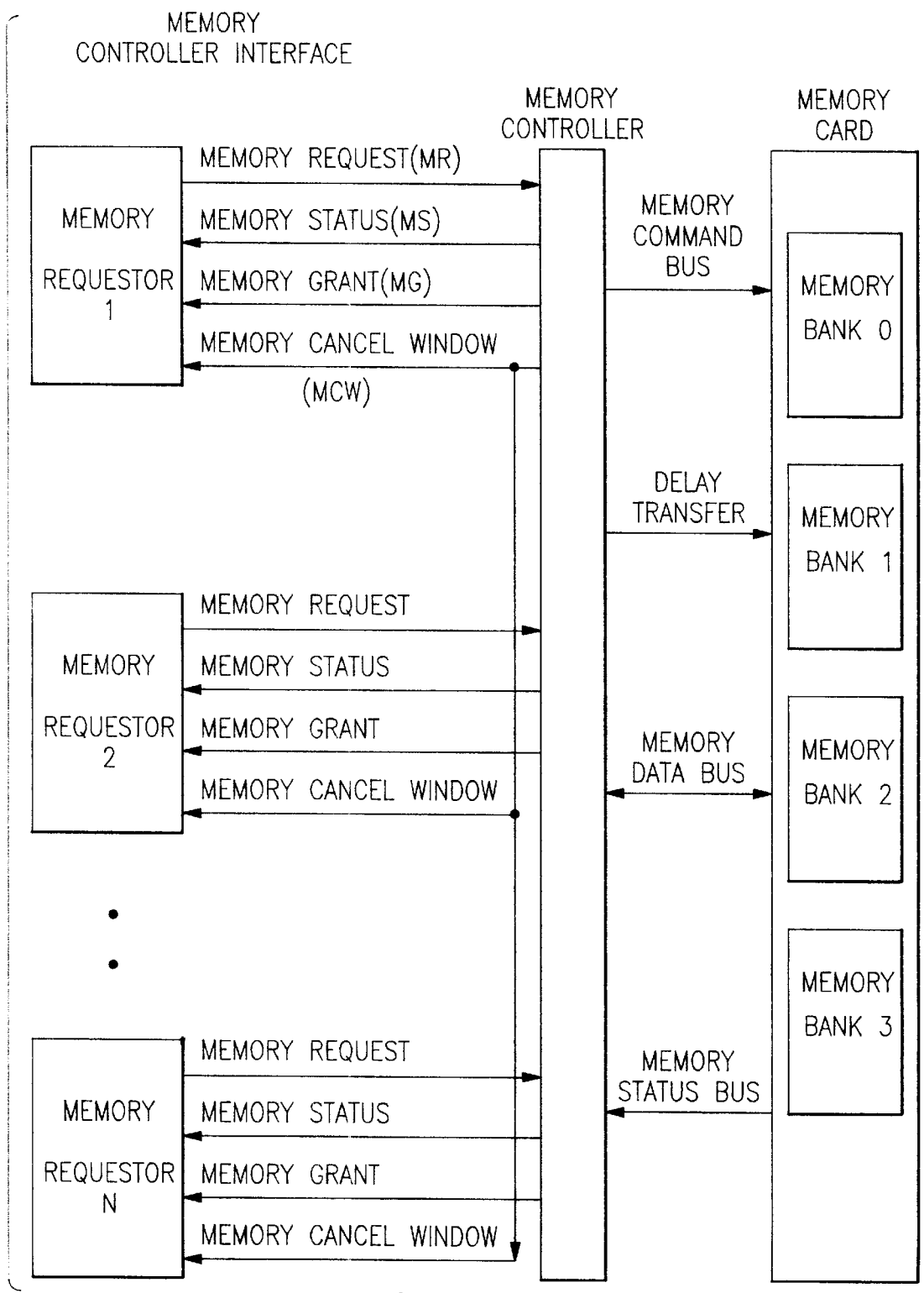

Turning now to our invention in greater detail, it will be seen from FIG. 2 which illustrates our preferred embodiment showing that the computer system comprising a central processor and a hierarchical memory system with multiple storage banks has its memory controller connected to multiple memory requesters. Each requestor raises the Memory Request (MR) signal when it wants to access the memory.

Once the memory controller has selected a particular memory requester, it will signal a Memory Grant (MG) to that requester and the corresponding memory resource will be busy for that duration. Meanwhile, the memory controller is broadcasting its Memory Cancel Window (MCW) to all memory requesters indicating that they can withdraw their memory request without any penalty to the system, this is due to the fact that there exists pre-defined cycles where the memory card is accessing our Storage key and the Key will be returned via the Memory Status (MS) bus at a pre-defined cycle.

If another memory requester doesn't need to access the memory after it has previously sent its Memory Request (MR) AND hasn't had it accepted by the memory controller with acknowledgement by a Memory Grant (MG), it can cancel its request by dropping the Memory Request (MR) signal to the memory controller while the memory Cancel Window is active. The handshake between that memory requestor and memory controller has finished and no further action is required.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method for use in a computer system comprising a central processor and a hierarchical memory system having at least one memory card and having a memory controller and interface logic with a memory requestor, comprising the steps of:

processing a memory request with protocol logic providing a cancel window of a predetermined finite number of cycles where a memory card cannot accept another command due to a resource conflict to provide an opportunity to re-balance requests to the memory controller via the cancel window in which a memory request can be withdrawn ("cancelled") without penalty and allowing another memory request to be accepted by the memory controller so that it can be processed once the memory card is no longer busy; and wherein a memory request is sent to a memory card having said controller every eight cycles synchronized with a key access cycle within the memory card whereby said controller knows exactly when to send a new request or when not to send a request to the memory card, and further when a memory requestor has been given the priority to send an access request to the memory controller, if subsequently the memory requester has determined that it wants to "cancel" its request before the memory controller has accepted it for execution, the memory controller uses the memory requester cancel window for that particular requestor to safely withdraw its request such that the memory controller and the memory card will not process the request and no memory cycles will be wasted, while making memory resources immediately available for other memory requesters.

2. A method according to claim 1 wherein a memory controller is connected to multiple memory requesters, and wherein with multiple controllers for the computer system each requestor raises a Memory Request (MR) signal when it wants to access the associated memory.

3. A method according to claim 2 wherein once a memory controller has selected a particular memory requestor, it will signal a Memory Grant (MG) to that requestor and the corresponding memory resource becomes busy for that duration, and during the busy duration the memory controller broadcasts its Memory Cancel Window (MCW) to all associated memory requesters indicating that they can withdraw their memory request, having not been accepted yet by the memory controller for execution, without any penalty to the system due to the fact that there exists pre-defined cycles where the memory card is accessing its storage key and the key will be returned via a Memory Status (MS) bus at a pre-defined cycle.

4. A method according to claim 3 wherein if another memory requester doesn't need to access the memory after it has previously sent its memory request and hasn't had it accepted by the addressed memory controller with acknowledgement by a Memory Grant (MG), it can cancel its request by dropping the Memory Request (MR) signal to the memory controller while the Memory Cancel Window is active, the handshake between that memory requester and memory controller being ended.

* * * * *